United States Patent
Lin et al.

(10) Patent No.: US 9,943,136 B2
(45) Date of Patent: Apr. 17, 2018

(54) SHOE UPPER

(71) Applicants: Huge Development Limited, Hong Kong (CN); Jiunn Jang Textile Co., Ltd., Changhwa Hsien (TW)

(72) Inventors: Ho-Pin Lin, Taichung (TW); Hsuan-Chia Su, Changhwa Hsien (TW)

(73) Assignees: Huge Development Limited, Hong Kong (CN); Jiunn Jang Textile Co., Ltd., Changhwa Hsien (TW)

( * ) Notice: Subject to any disclaimer, the term of this patent is extended or adjusted under 35 U.S.C. 154(b) by 0 days.

(21) Appl. No.: 15/373,520

(22) Filed: Dec. 9, 2016

(65) Prior Publication Data
US 2018/0035756 A1 Feb. 8, 2018

(30) Foreign Application Priority Data
Aug. 5, 2016 (TW) .............................. 105211885 U (51) Int. Cl.
| A43B 23/00 | (2006.01) |
| A43B 23/02 | (2006.01) |
| A43B 1/00 | (2006.01) |
| A43B 7/06 | (2006.01) |
| A43B 7/08 | (2006.01) |
| A43B 1/04 | (2006.01) |

(52) U.S. Cl.
CPC .......... *A43B 23/022* (2013.01); *A43B 1/0027* (2013.01); *A43B 1/04* (2013.01); *A43B 7/06* (2013.01); *A43B 7/085* (2013.01); *A43B 23/026* (2013.01)

(58) Field of Classification Search
CPC .. A43B 1/04; A43B 1/02; A43B 7/085; A43B 7/06; A43B 23/022; A43B 23/023
See application file for complete search history.

(56) References Cited

U.S. PATENT DOCUMENTS

| 2005/0193592 A1* | 9/2005 | Dua ......................... A43B 1/04 36/45 |
| 2005/0208860 A1* | 9/2005 | Baron ..................... A41D 27/28 442/414 |
| 2016/0345674 A1* | 12/2016 | Bruce ................ A43B 23/0245 |
| 2017/0099908 A1* | 4/2017 | Lee .......................... A43B 1/04 |
| 2017/0127753 A1* | 5/2017 | Kohatsu ................... A43B 7/24 |
| 2017/0156434 A1* | 6/2017 | Tamm ..................... A43B 3/106 |
| 2017/0164681 A1* | 6/2017 | Frank ..................... A43B 3/108 |
| 2018/0000188 A1* | 1/2018 | Dua ......................... A43B 9/02 |

* cited by examiner

*Primary Examiner* — Ted Kavanaugh
(74) *Attorney, Agent, or Firm* — Trop Pruner & Hu, P.C.

(57) ABSTRACT

A shoe upper includes a mesh covering unit having opposite first and second surfaces and including a plurality of first and second yarns, and a fabric layer disposed on the second surface. Each of the first yarns has a first core yarn, and a first coating layer wrapped around the first core yarn and made from a thermoplastic material. The first and second yarns are interknitted to form a plurality of holes extending through the first and second surfaces, and to have first portions of the first coating layers and first portions of the second yarns forming the first surface, and second portions of the first coating layers and second portions of the second yarns forming the second surface The first portions of the first coating layers at the first surface are larger in surface area than the second portions of the first coating layers at the second surface.

11 Claims, 10 Drawing Sheets

SHOE UPPER

CROSS-REFERENCE TO RELATED APPLICATION

This application claims priority of Taiwanese Utility Model Application No. 105211885, filed on Aug. 5, 2016.

FIELD

The disclosure relates to a shoe upper, and more particularly to a shoe upper made from a thermoplastic material.

BACKGROUND

Taiwanese patent no. M464032 discloses a shoe upper including an upper layer and a lower layer which are formed from elastomeric yarns by a warp knitting machine. A slot is formed in the middle of the upper layer. Two portions of the upper layer that are disposed oppositely with respect to the slot are respectively formed with patterns. The material of the elastomeric yarns is likely to tear, so that the patterns on the upper layer may be become distorted. Therefore, the strength and pliability of the shoe upper are not satisfactory.

Both Taiwanese patent nos. 1533816 and M516334 disclose a multilayer shoe upper made from composite materials that are formed into a one-piece upper by hot-pressing. Although this shoe upper has enhanced strength and pliability, it may cause discomfort to wearers and has poor air permeabilty.

SUMMARY

Therefore, an object of the disclosure is to provide a shoe upper that can alleviate at least one of the drawbacks of the prior art.

According to the disclosure, the shoe upper includes a mesh covering unit having opposite first and second surfaces and including a plurality of first yarns and a plurality of second yarns and a fabric layer disposed on the second surface of the mesh covering unit. Each of the first yarns has a first core yarn and a first coating layer that is wrapped around the first core yarn and that is made from a thermoplastic material. The first yarns and the second yarns are interknitted to form a plurality of holes extending through the first and second surfaces, and to have first portions of the first coating layers of the first yarns and first portions of the second yarns forming the first surface, and second portions of the first coating layers of the first yarns and second portions of the second yarns forming the second surface The first portions of the first coating layers at the first surface are larger in surface area than the second portions of the first coating layers at the second surface.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
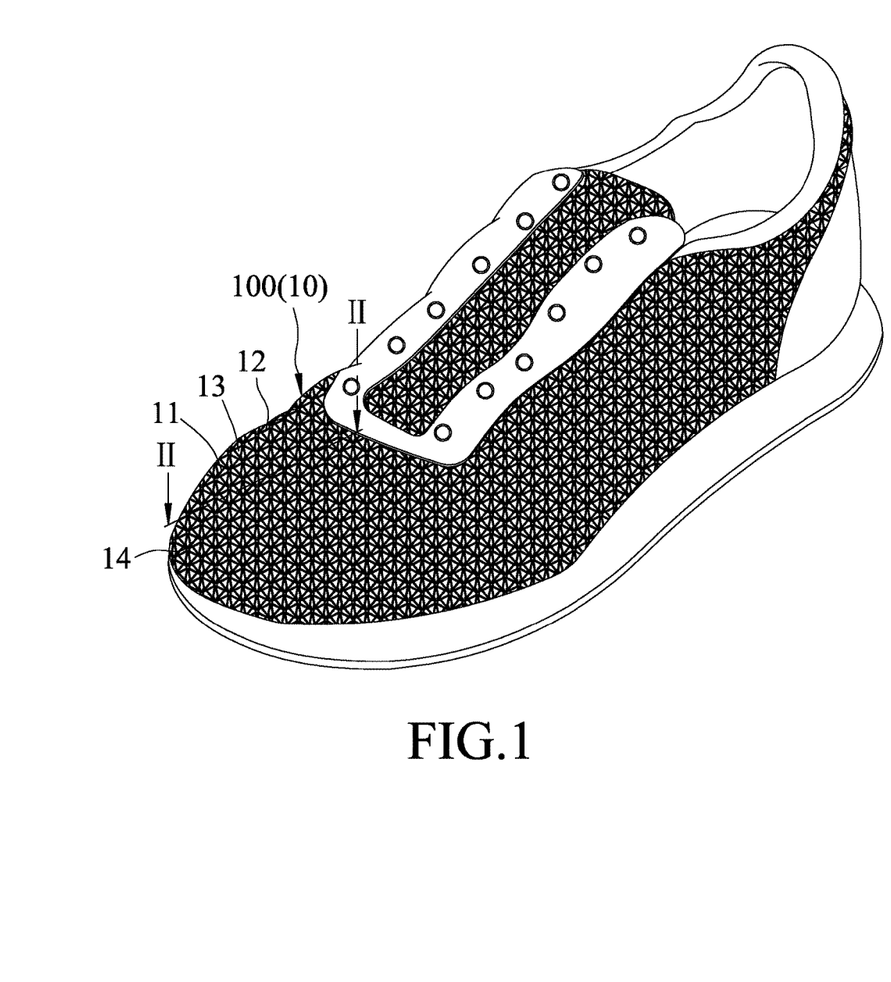
FIG. 1 is a perspective view showing a shoe that includes a first embodiment of a shoe upper of this disclosure.
Figure 2:
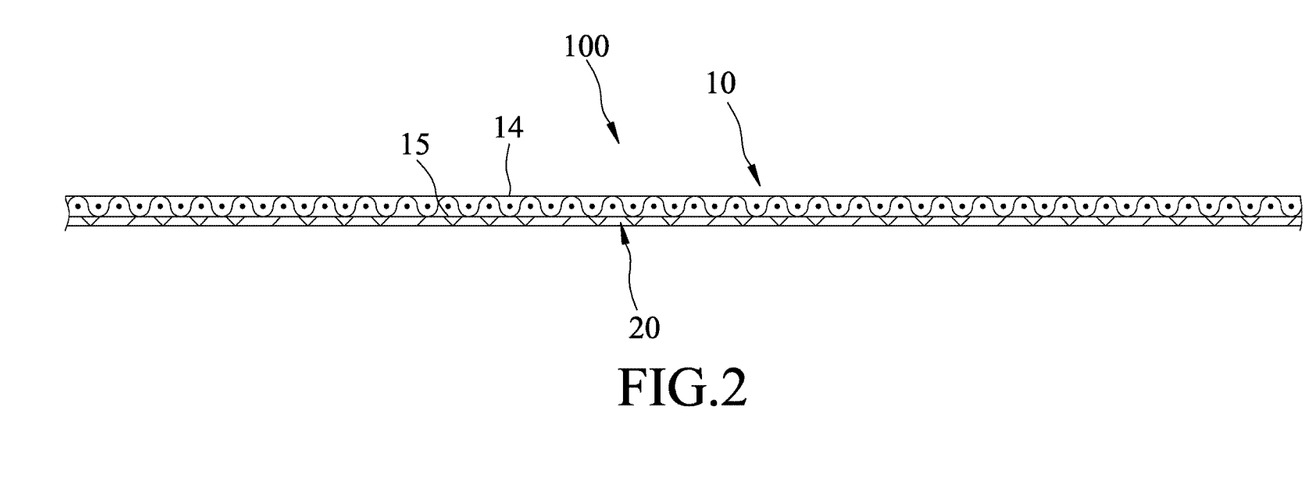
FIG. 2 is a fragmentary schematic view of the first embodiment taken along line II-II in FIG. 1.

Referring to FIGS. 1 and 2, the first embodiment of a shoe upper 100 according to the present disclosure includes a mesh covering unit 10 and a fabric layer 20.

Figure 5:
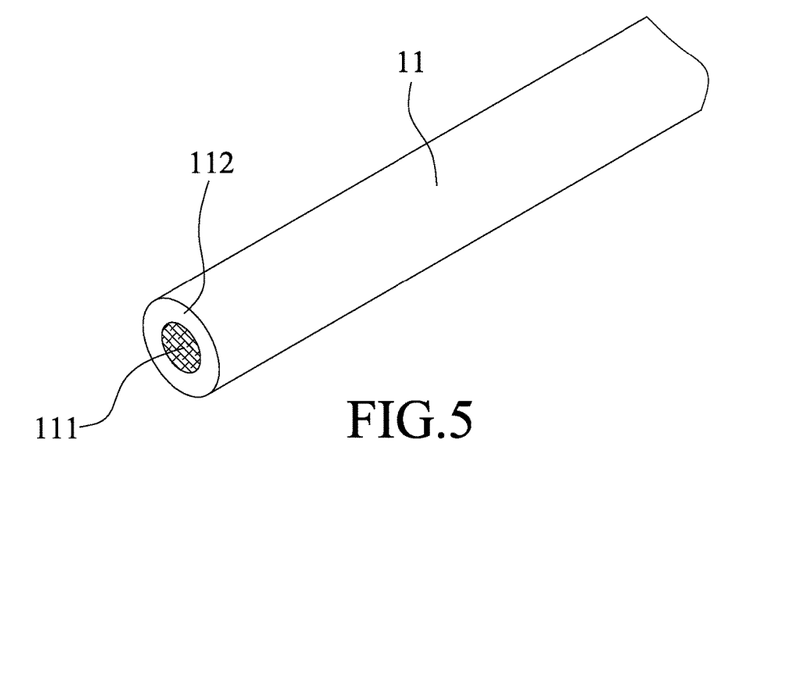
FIG. 5 is a fragmentary perspective view of a first yarn of the first embodiment.
Figure 6:
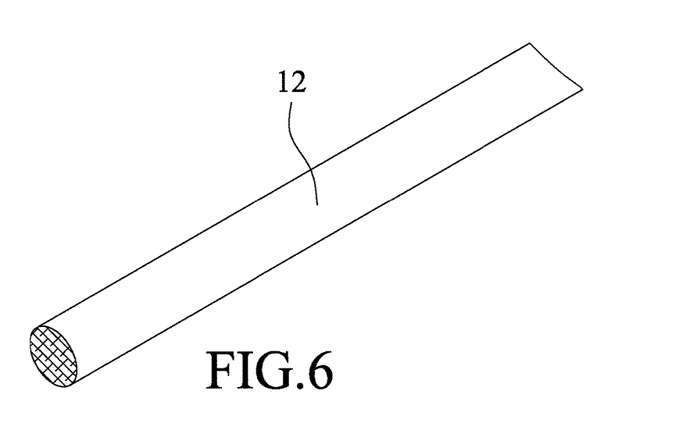
FIG. 6 is a fragmentary perspective view of a second yarn of the first embodiment.

Referring to FIGS. 2, 5 and 6, the mesh covering unit 10 has opposite first and second surfaces 14, 15 and includes a plurality of first yarns 11 and a plurality of second yarns 12. Each of the first yarns 11 has first core yarn 111 and a first coating layer 112 that is wrapped around the first core yarn 111. The first core yarns 111 and the second yarns 12 may be individually made of natural fibers, synthetic fibers or the combination thereof. In certain embodiments, the first core yarns 111 and the second yarns 12 may be individually made of nylon fibers, polyester fibers, glass fibers, mineral fibers, metallic fibers, and the like. The first coating layer 112 is made from a thermoplastic material, such as thermoplastic polyurethane (TPU) thermoplastic rubber (TPR), polyethylene (PE) polypropylene (PP) and polyvinylchloride (PVC)

Figure 3:
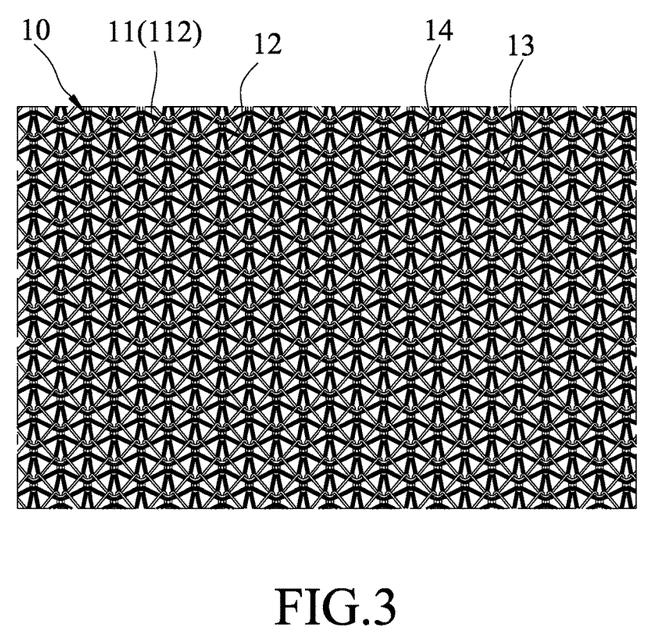
FIG. 3 is a schematic view of a first surface of a mesh covering unit of the first embodiment.
Figure 4:
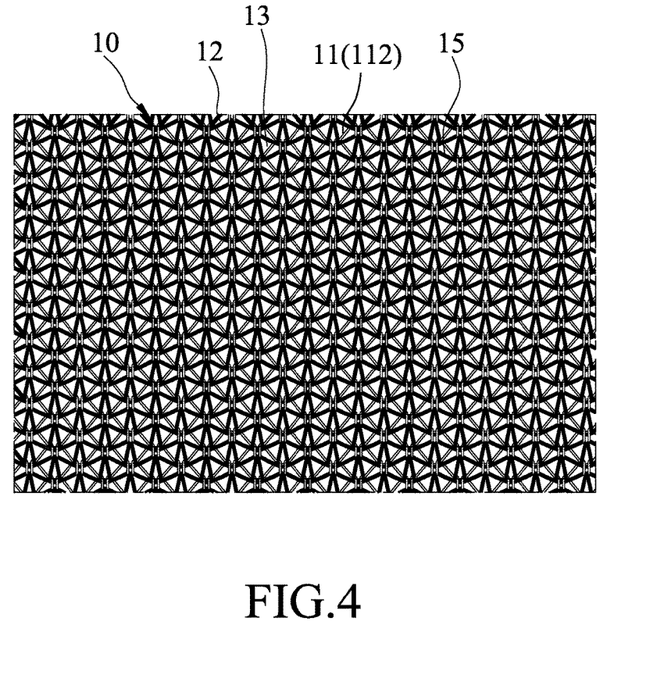
FIG. 4 is a schematic view of a second surface of the mesh covering unit of the first embodiment.

Referring to FIGS. 2 to 4, the first yarns 11 and the second yarns 12 are interknitted to have first portions of the first coating layers 112 of the first yarns 11 and first portions of the second yarns 12 forming the first surface 14, and to have second portions of the first coating layers 112 of the first yarns 11 and second portions of the second yarns 12 forming the second surface 15. In addition, the interknitted first and second yarns 11, 12 form a plurality of holes 13 extending through the first and second surfaces 14, 15. These holes 13 can provide good air permeability. The first portions of the first coating layers 112 at the first surface 14 are larger in surface area than the second portions of the first coating layers 112 at the second surface 15, so that the first surface 14 (as an outer surface exposed to the ambient environment) has excellent abrasion resistance.

The fabric layer 20 is disposed on the second surface 15 of the mesh covering unit 10, so that a wearer may feel more comfortable.

It should be noted that, the first yarns 11, the second yarns 12 and the fabric layer 20 may have different colors, thereby allowing for increased flexibility in design of the shoe upper 10.

Figure 7:
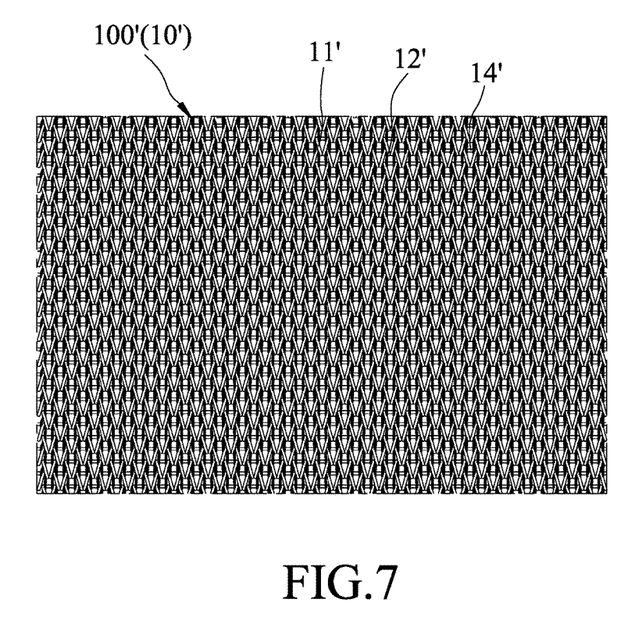
FIG. 7 is a schematic view illustrating a first surface of a mesh covering unit of a second embodiment of the shoe upper of this disclosure.
Figure 8:
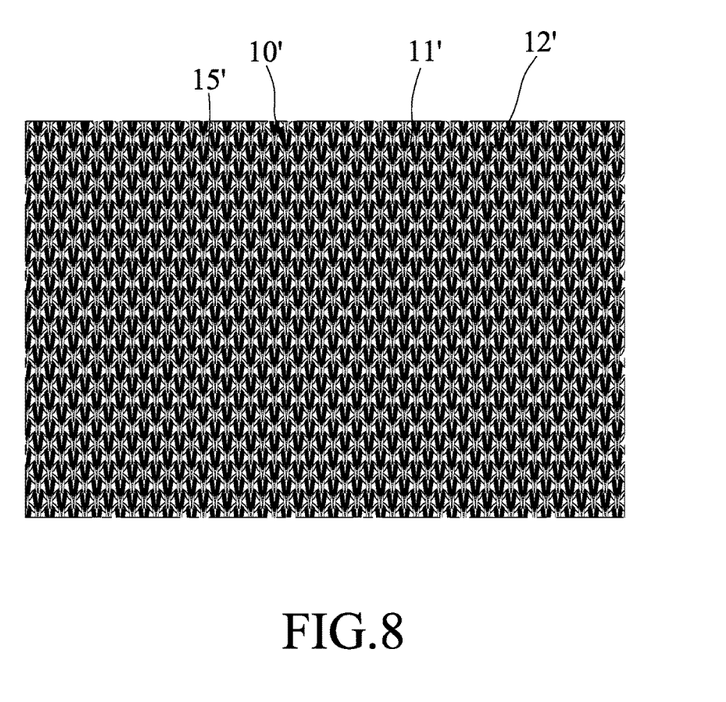
FIG. 8 is a schematic view illustrating a second surface of the mesh covering unit of the second embodiment.

FIGS. 7 and 8 illustrate the second embodiment of the shoe upper 100' according to the present disclosure. The second embodiment differs from the first embodiment in that the first yarns 11' and the second yarns 12' of the mesh covering unit 10' are interknitted to form a different pattern on the first and second surfaces 14', 15', while providing substantially the same function as that of the first embodiment.

Figure 9:
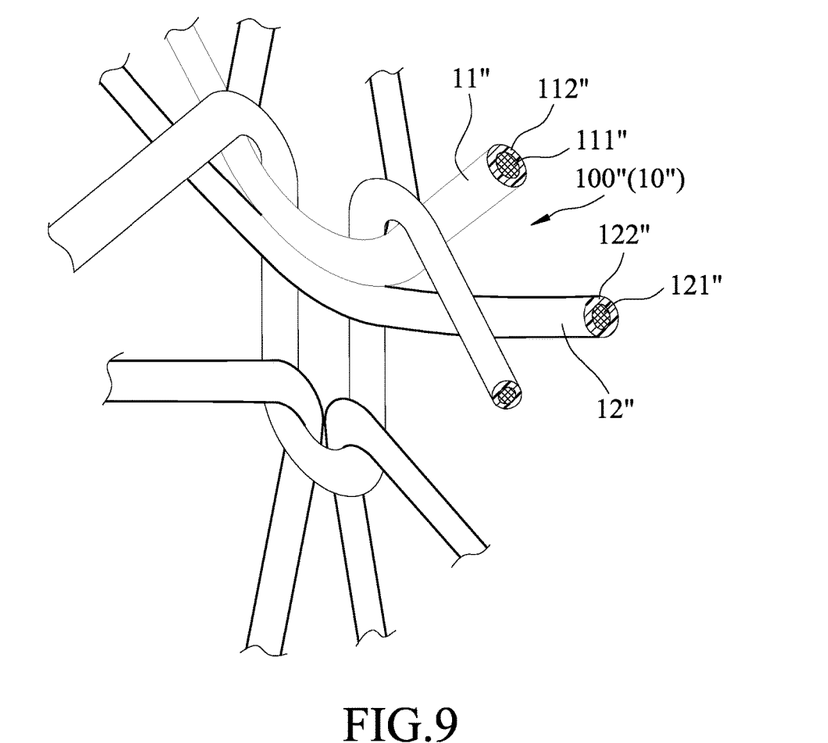
FIG. 9 is a fragmentary perspective view illustrating first yarns and second yarns of a third embodiment of the shoe upper of this disclosure.

FIG. 9 illustrates the third embodiment of the shoe upper 100" of this disclosure. The third embodiment differs from the first embodiment in that each of the second yarns 12" of the mesh covering unit 10" has a second core yarn 121" and a second coating layer 122" that is wrapped around the second core yarn 121". In this embodiment, the second core yarns 121" may be made of natural fibers, synthetic fibers or the combination thereof. The second core yarns 121" may be made of nylon fibers, polyester fibers, glass fibers, mineral fibers, metallic fibers, and the like. The second coating layers 122" may be made from a thermoplastic material, such as thermoplastic polyurethane (TPU), thermoplastic rubber (TPR), polyethylene (PE), polypropylene (PP) and polyvinylchloride (PVC). The first coating layers 112" wrapped around the first core yarn 111" and the second coating layers 122" wrapped around the second core yarn 121" may allow the shoe upper 100" to have high structural strength, pliability and abrasion resistance.

It is worth noting that use of the thermoplastic material instead of whole natural fiber to manufacture the first yarns 11, 11', 11" and/or the second yarns 12" can save in manufacturing costs. Moreover, when a decorative element (not shown) is applied to the shoe upper 100, 100', 100", the decorative element can be added to the first coating layers 112, 112" and/or the second coating layers 122" at the first surface 14 by high frequency welding, rather than by machine sewing or an adhesive agent commonly used for attaching the decorative element onto the mesh covering unit which is entirely made of natural fibers. As such, the decorative element can be processed accurately, conveniently and in a cost-saving manner.

Figure 10:
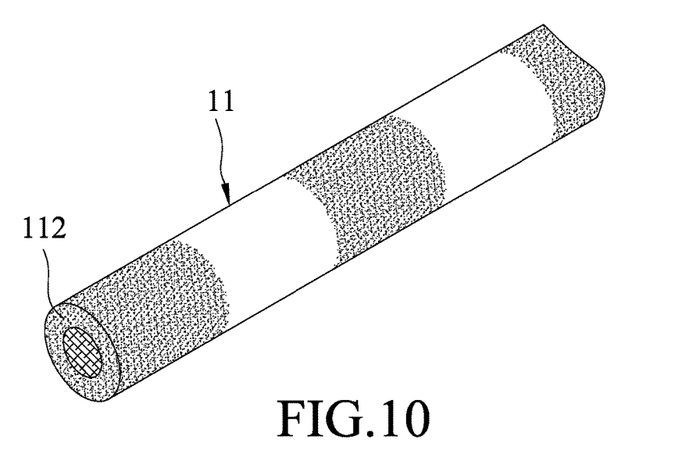
FIG. 10 is a fragmentary perspective view illustrating a first yarn of a fourth embodiment of the shoe upper of this disclosure.
Figure 11:
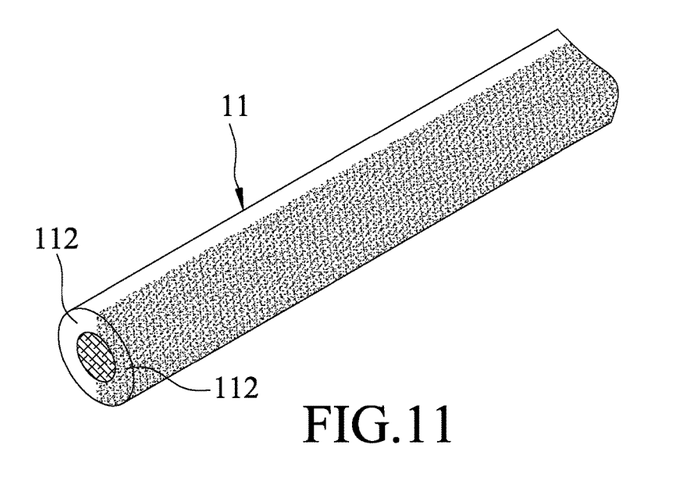
FIG. 11 is a fragmentary perspective view illustrating a first yarn of a fifth embodiment of the shoe upper of this disclosure.

FIGS. 10 and 11 respectively illustrate the fourth and fifth embodiments of the shoe upper of this disclosure, in which the first coating layers 112 of the first yarns 11 have at least two colors. In the fourth embodiment, the first coating layer 112 of each of the first yarns 11 extends in a longitudinal direction, and the at least two colors are disposed spaced apart from each other along the longitudinal direction (see FIG. 10). Alternatively, in the fifth embodiment, the at least two colors are disposed spaced apart from each other along a circumferential direction of the first yarns 11 (see FIG. 11). With the inclusion of different colors on the first coating layers 112, the shoe upper may form various patterns or particular logos. Similarly, the second yarns (or the second coating layers) may have at least two colors and the distribution thereof may vary depending on actual requirements.

Figure 12:
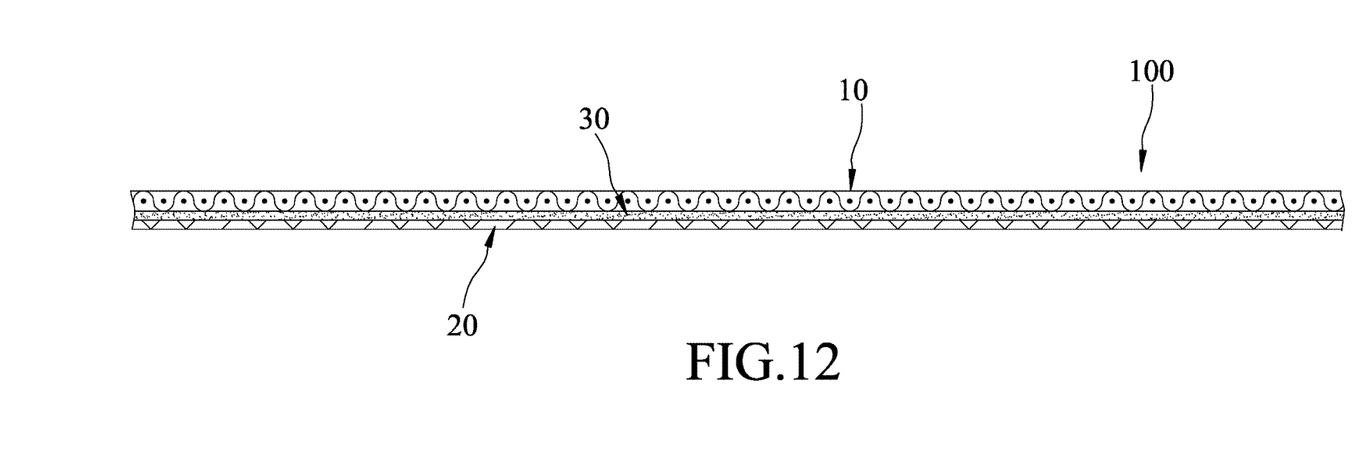
FIG. 12 is a fragmentary schematic view of a sixth embodiment of the shoe upper of this disclosure.

Referring to FIG. 12, the sixth embodiment of the shoe upper 100 according to this disclosure is similar to that of the first embodiment, except that the shoe upper 100 further includes a moisture-permeable waterproof layer 30 disposed between the mesh covering unit 10 and the fabric layer 20. In this embodiment, the moisture-permeable waterproof layer 30 may assist in releasing the moisture within a shoe having the shoe upper 100 to the ambient environment without permitting water to enter into the shoe.

In summary, by virtue of the thermoplastic first coating layers 112 to wrap around the core yarns 111, the shoe upper 100 of this disclosure can have high strength, pliability and abrasion resistance.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A shoe upper comprising:
  a mesh covering unit having opposite first and second surfaces and including a plurality of first yarns and a plurality of second yarns, each of said first yarns having a first core yarn and a first coating layer that is wrapped around said first core yarn and is made from a thermoplastic material, said first yarns and said second yarns being interknitted to form a plurality of holes extending through said. first and second surfaces, and to have first portions of said first coating layers of said first yarns and first portions of said second yarns forming said first surface, and second portions of said first coating layers of said first yarns and second portions of said second yarns forming said second surface, said first portions of said first coating layers at said. first surface being larger in surface area than said second portions of said first coating layers at said second surface; and
  a fabric layer disposed on said second surface of said mesh covering unit.

2. The shoe upper of claim 1, wherein said thermoplastic material of said first coating layer is selected from the group consisting of thermoplastic polyurethane (TPU), thermoplastic rubber (TPR), polyethylene (PE), polypropylene (PP) and polyvinylchloride (PVC).

3. The shoe upper of claim 1, wherein said first core yarns and said second yarns are individually selected from the group consisting of nylon yarn, polyester fiber yarn and glass yarn.

4. The shoe upper of claim 1, wherein each of said second yarns has a second core yarn and a second coating layer that is wrapped around said second core yarn and that is made from a thermoplastic material.

5. The shoe upper of claim 4, wherein said second coating layers have at least two colors.

6. The shoe upper of claim 4, wherein said thermoplastic materials of said first coating layer and second coating layer are individually selected from the group consisting of thermoplastic polyurethane (TPU) thermoplastic rubber (TPR) polyethylene (PE), polypropylene (PP) and polyvinylchloride (PVC).

7. The shoe upper of claim 6, wherein said first and second core yarns are individually selected from the group consisting of nylon yarn, polyester fiber yarn and glass yarn.

8. The shoe upper of claim 1, further comprising a moisture-permeable waterproof layer disposed between said mesh covering unit and said fabric layer.

9. The shoe upper of claim 1, wherein said first coating layers have at least two colors.

10. The shoe upper of claim 9, wherein said first coating layer of each of said first yarns extends in a longitudinal direction, and said at least two colors are disposed spaced apart from each other along the longitudinal direction.

11. The shoe upper of claim 9, wherein said at least two colors are disposed spaced apart from each other along a circumferential direction of said first yarns.

* * * * *